US010259178B2

(12) United States Patent
Imai et al.

(10) Patent No.: US 10,259,178 B2
(45) Date of Patent: Apr. 16, 2019

(54) METHOD FOR PRODUCING LENS ARRAY, AND MOLDING MOLD

(71) Applicant: KONICA MINOLTA, INC., Tokyo (JP)

(72) Inventors: Toshiyuki Imai, Hachioji (JP); Daisuke Watanabe, Niiza (JP); Akira Sato, Ritto (JP)

(73) Assignee: Konica Minolta, Inc., Tokyo (JP)

(*) Notice: Subject to any disclaimer, the term of this patent is extended or adjusted under 35 U.S.C. 154(b) by 1101 days.

(21) Appl. No.: 14/365,975

(22) PCT Filed: Dec. 14, 2012

(86) PCT No.: PCT/JP2012/082478
§ 371 (c)(1),
(2) Date: Jan. 5, 2015

(87) PCT Pub. No.: WO2013/089223
PCT Pub. Date: Jun. 20, 2013

(65) Prior Publication Data
US 2018/0141291 A1 May 24, 2018

(30) Foreign Application Priority Data
Dec. 16, 2011 (JP) .................. 2011-276525

(51) Int. Cl.
B29C 33/42 (2006.01)
B29C 43/02 (2006.01)
(Continued)

(52) U.S. Cl.
CPC ........ B29D 11/00009 (2013.01); B29C 33/42 (2013.01); B29C 43/021 (2013.01);
(Continued)

(58) Field of Classification Search
CPC .................................................. B29D 11/00298
See application file for complete search history.

(56) References Cited

U.S. PATENT DOCUMENTS 7,704,418 B2    4/2010  Rudmann et al.
2007/0216049 A1 9/2007  Rudmann et al.
(Continued)

FOREIGN PATENT DOCUMENTS

CN    101426638    5/2009
CN    101945754    1/2011
(Continued)

OTHER PUBLICATIONS

CN102729405A Google Patents Machine Translation Performed on Feb. 15, 2018. (Year: 2018).*
(Continued)

Primary Examiner — Lisa L Herring
(74) Attorney, Agent, or Firm — Cozen O'Connor

(57) ABSTRACT

Method for producing a lens array, which can prevent a weld from being formed in the peripheral part of a lens part and suppress increase of a work time of a transfer mold, and a molding mold. Since a master mold 10 of a molding mold has a plurality of linear groove parts 14e surrounding a plurality of cavity parts 12, resin hardly spreads to a corner part 14p where the adjacent linear groove parts 14e and 14e intersect each other and it is possible to prevent portions of the resin which have run over toward the adjacent groove parts 14e and 14e from spreading so as to come close to each other and being brought into contact with each other to create a weld trapping air bubbles.

15 Claims, 14 Drawing Sheets

(51) Int. Cl.
    *B29D 11/00* (2006.01)
    *G02B 3/00* (2006.01)
(52) U.S. Cl.
    CPC .... *B29D 11/0048* (2013.01); *B29D 11/00298* (2013.01); *G02B 3/0031* (2013.01); *G02B 3/0056* (2013.01); *G02B 3/0068* (2013.01)

(56) References Cited

U.S. PATENT DOCUMENTS

| | | | | |
|---|---|---|---|---|
| 2008/0225390 | A1* | 9/2008 | Chang | B29D 11/00365 359/558 |
| 2012/0200943 | A1* | 8/2012 | Gallagher | B29D 11/00307 359/737 |
| 2012/0242814 | A1* | 9/2012 | Kubala | B26F 1/38 348/76 |

FOREIGN PATENT DOCUMENTS

| | | | |
|---|---|---|---|
| CN | 102729405 A | * | 10/2012 |
| JP | 2001-277260 | | 10/2001 |
| JP | 2009-530135 | | 8/2009 |
| JP | 2009-226634 | | 10/2009 |
| JP | 2010-125611 | | 6/2010 |

OTHER PUBLICATIONS

CN102729405A Translation by FLS, Inc. Performed Feb. 2018. (Year: 2018).*

* cited by examiner

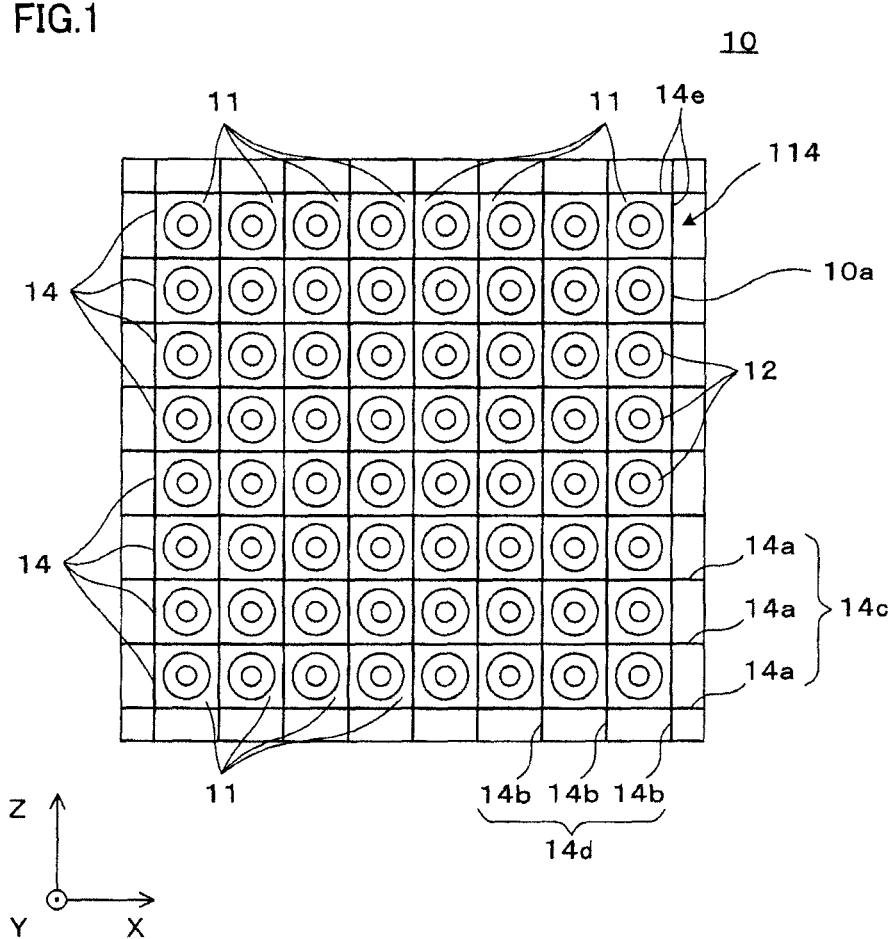

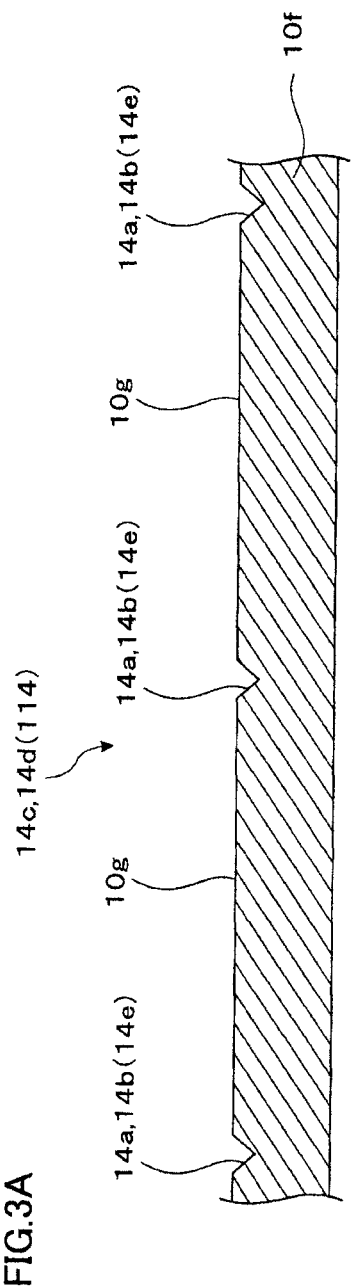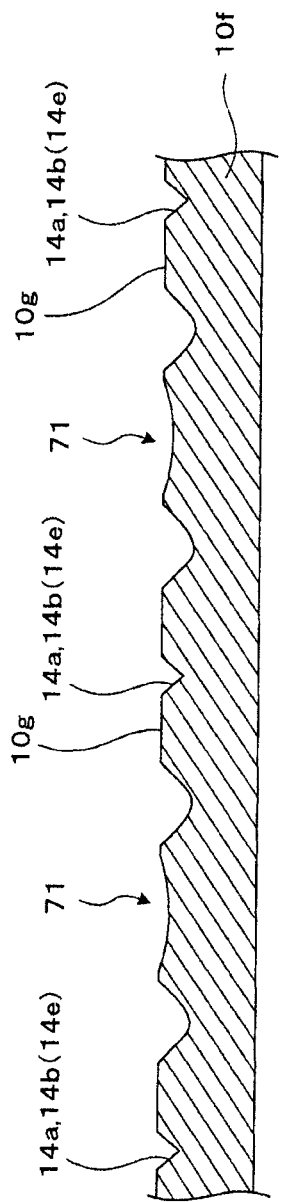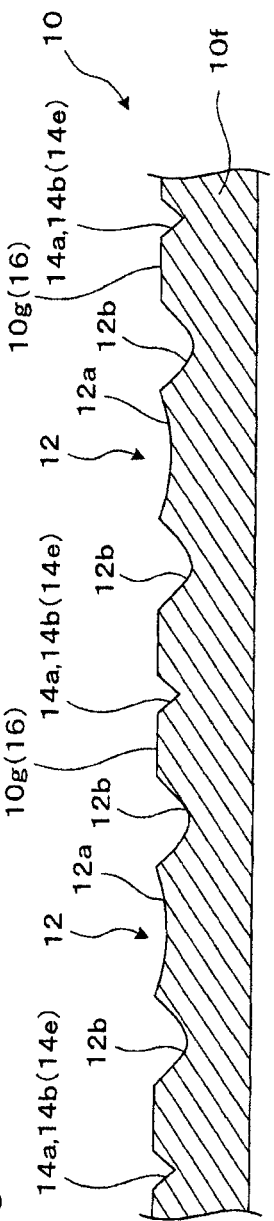

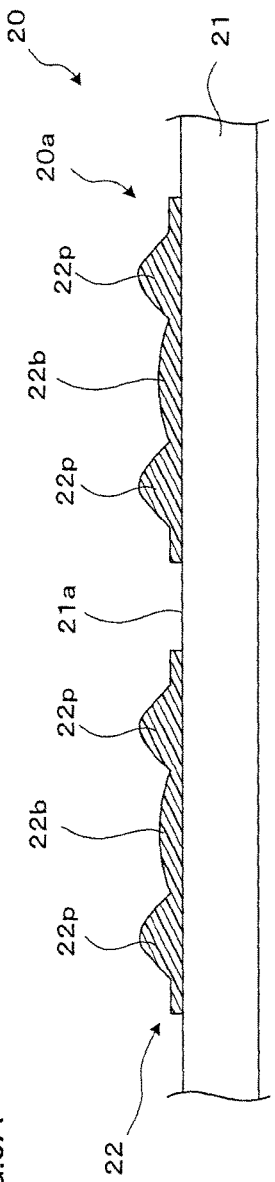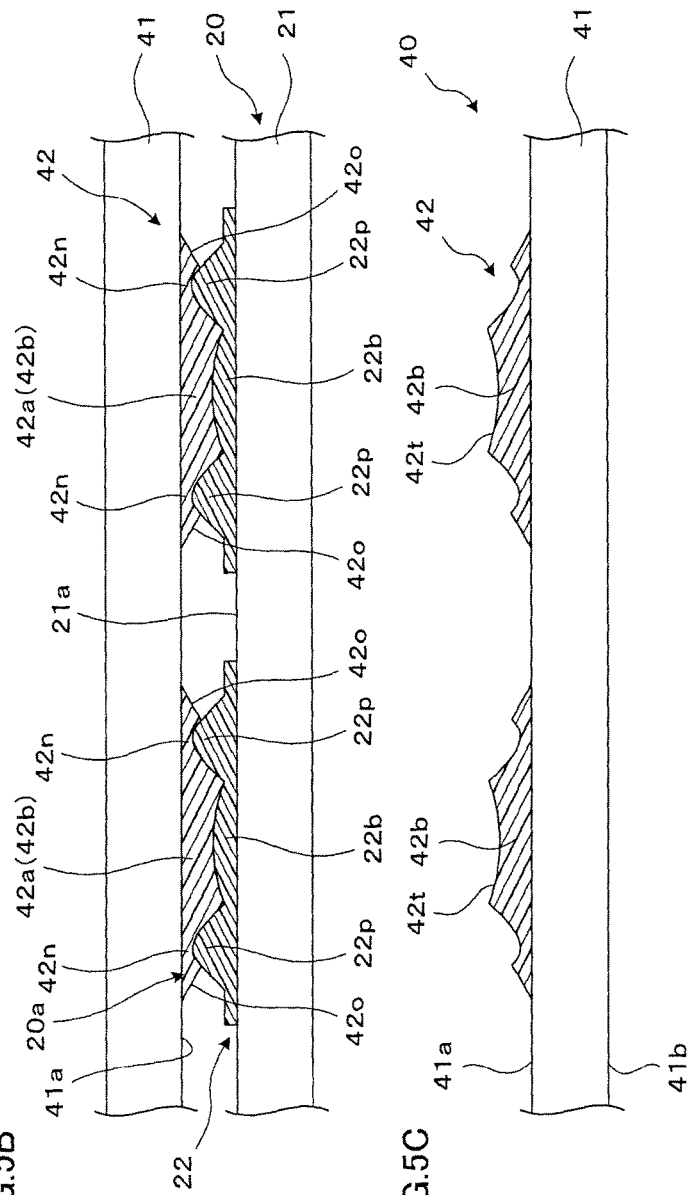
FIG.5A
FIG.5B
FIG.5C

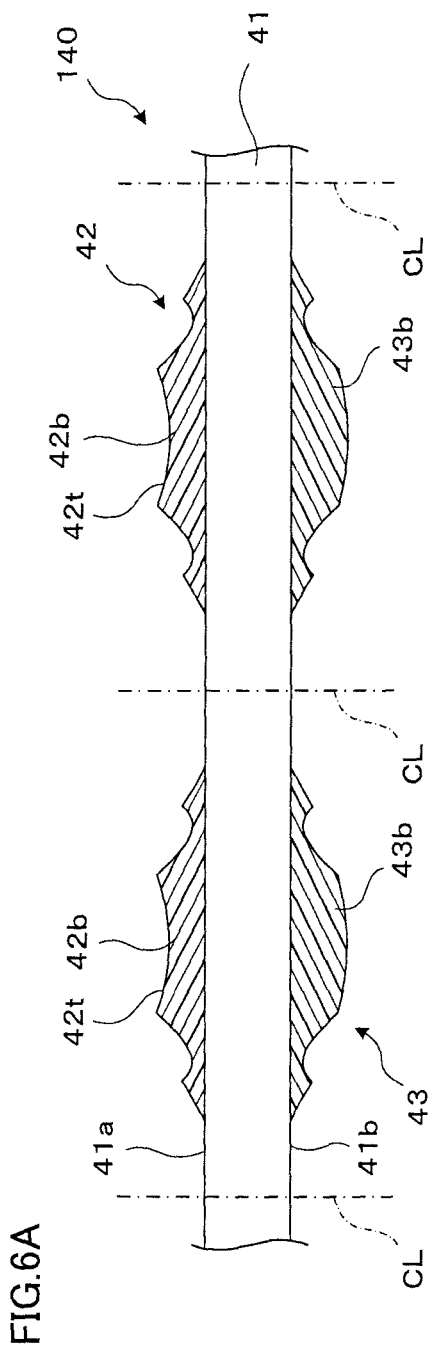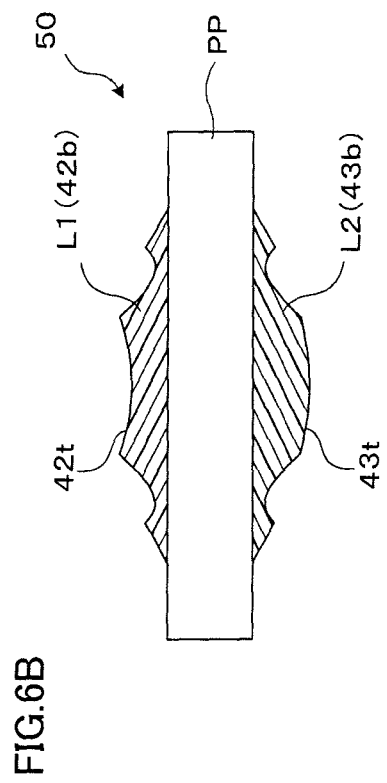
FIG.6A
FIG.6B

PRIOR ART

METHOD FOR PRODUCING LENS ARRAY, AND MOLDING MOLD

RELATED APPLICATIONS

This is a U.S. National stage of International application No. PCT/JP2012/082478 filed on Dec. 14, 2012.

This patent application claims the priority of Japanese application no. 2011-276525 filed Dec. 16, 2011, the disclosure content of which is hereby incorporated by reference.

TECHNICAL FIELD

This invention relates to a method for producing a lens array having a plurality of lenses and to a molding mold, in particular, relates to a method for producing a lens array which is obtained by forming a transfer layer made of resin on a substrate and to a molding mold.

BACKGROUND ART

As a method for producing a lens array having a resin transfer layer provided on a substrate, there exists one that forms a concave part so as to surround each transfer part provided in a molding mold and prevents transfer material from spreading around. Specifically, the resin is prevented from spreading outward by providing a buffer part which is a hollow around a ring-band shaped spacer part surrounding a cavity part for transfer, and also a resin confinement structure of an edge or a groove is provided in the spacer part (refer to patent literature 1). For reference, FIGS. 1 and 2 in patent literature 1 are attached in FIG. 14.

In another example, a spacer part having a small spacing is provided around an element capacitance part, and also an overflow part having a large spacing is provided thereoutside to allow resin to flow to the overflow part having the large spacing, and thereby the spread of the resin is prevented (refer to patent literature 2). For reference, FIG. 1 in patent literature 2 is attached in FIG. 15.

In a method for producing a lens array as described above, since a ring-shaped spacer part is provided so as to surround a cavity part, when resin which has run over around the spacer part spreads along the periphery of the spacer part and contacts the resin from the opposite side, the resin create a weld to trap air bubbles. Further, a buffer part or an overflow part around the spacer part, and a transfer mold for providing these parts, are a hollow that needs to be formed by machining work using a cutting tool such as an end mill, and a long time is required for the work of the transfer mold. In particular, as a lens of the lens array becomes smaller and the lens array is more highly integrated, the buffer part becomes also smaller and the work time of the transfer mold is increased considerably.

CITATION LIST

Patent Literature

PTL 1: U.S. Patent Application Publication No. 2007/0216049

PTL 2: U.S. Pat. No. 7,704,418

SUMMARY OF INVENTION

The present invention has been achieved in view of the above background art, and aims to provide a method for producing a lens array, which can prevent a weld from being formed around a lens part and suppress increase in the work time of a transfer mold, and a molding mold.

For achieving the above purpose, a method for producing a lens array according to the present invention is one that includes a substrate and a resin layer which is formed on at least one substrate surface of the substrate and has a plurality of lens parts, wherein the plurality of lens parts is formed by one or more transfers utilizing a master molding mold which has a transfer surface corresponding to a surface shape of the plurality of lens parts, and wherein the molding mold has a plurality of cavity parts corresponding to the plurality of lens parts and a plurality of linear groove parts surrounding individual cavity parts which configure the plurality of cavity parts, respectively.

According to the above production method, since the molding mold has the plurality of linear groove parts surrounding the plurality of cavity parts, compared with a conventional buffer part which is a hollow provided in the peripheral of a ring-band shaped spacer part, resin hardly spreads to a corner part where the adjacent linear groove parts intersect each other and it is possible to prevent portions of the resin which have run over toward the adjacent groove parts from spreading so as to come close to each other and being brought into contact with each other to create a weld trapping air bubbles. Further, the linear groove parts are not separated but connected to be collectively worked, and a molding mold can be worked in a short time even if a lens becomes smaller.

According to a specific aspect or viewpoint of the present invention, in the above method for producing a lens array, the molding mold is partitioned into a plurality of mold areas by the plurality of linear groove parts. In this case, the molding mold can be divided efficiently into the plurality of mold areas by the boundaries of the plurality of linear groove parts.

According to another aspect of the present invention, the molding mold is partitioned into a plurality of polygonal mold areas by a combination of the plurality of linear groove parts. In this case, the molding mold can be divided efficiently into the plurality of mold areas only by the plurality of linear groove parts.

According to still another aspect of the present invention, the molding mold is partitioned into a plurality of rectangular mold areas by a grid-like arrangement of the plurality of linear groove parts. In this case, the molding mold can be divided efficiently into the plurality of mold areas by the formation of the plurality of parallel linear groove parts only in two orthogonal directions.

According to still another aspect of the present invention, each of the plurality of linear groove parts has an edge on a surface side. In this case, the resin hardly runs over into the groove part by an anchor effect in which a contact angle becomes apparently larger at the edge, and it is possible to securely prevent the portions of the resin which have run over from the neighboring lenses from being connected to each other.

According to still another aspect of the present invention, each of the plurality of linear groove parts has any cross-sectional shape of a trapezoidal shape, a V-shape, a rectangular shape, a polygonal shape, a semicircular shape, and an ellipsoidal shape.

According to still another aspect of the present invention, each of the plurality of linear groove parts has a groove depth smaller than each depth of the plurality of cavity parts. Accordingly, even when the resin reaches the bottom of the groove part, it is possible to prevent protrusions from becoming higher in a part corresponding to the plurality of groove parts than in a part corresponding to the plurality of cavity parts, in a shape formed by the molding mold, and it is possible to prevent a problem caused by that this higher protrusion hits a member facing this molded component in the next process. Further, this is also advantageous in mold release.

According to still another aspect of the present invention, each of the plurality of linear groove parts has a groove width not smaller than 200 μm. In this case, since the resin has a thickness of approximately 50 μm in the vicinity of the groove part, the groove part is prevented from being filled with the resin, and it is possible to securely prevent the portions of the resin which have run over from the neighboring lenses from being connected to each other. The groove width is a width of an outer edge where the groove part is formed in the surrounding of the cavity part in the molding surface, a width of the groove part along a cross-sectional direction between the neighboring cavity parts provided in the transfer surface, and a groove width w which is to be described below.

Here, when the thickness of the resin material in the surrounding of the groove part is assumed to be t [μm], this groove width w of the groove part is set preferably so as to satisfy the following condition.

$$w > 50 \cdot \ln(t) + 2$$

In this case, it becomes easy to obtain a minimum groove width suitable for the resin material thickness.

For achieving the above purpose, a molding mold according to the present invention is a molding mold for directly or indirectly forming the lens array that includes a substrate and a resin layer which is formed on one substrate surface of the substrate and has a plurality of lens parts, and includes a plurality of cavity parts corresponding to the plurality of lens parts and a plurality of linear groove parts surrounding individual cavity parts configuring the plurality of cavity parts.

According to the above molding mold, since the molding mold has the plurality of linear groove parts surrounding the plurality of cavity parts, resin hardly spreads to a corner part where the adjacent linear groove parts intersect each other and it is possible to prevent portions of the resin which have run over toward the adjacent groove parts from spreading so as to come close to each other and being brought into contact with each other to create a weld trapping air bubbles. Further, the linear groove part can be formed by collective working and the molding mold can be worked in a short time even if a lens becomes smaller.

BRIEF DESCRIPTION OF DRAWINGS

FIG. 1 is a plan view explaining a master mold which is a molding mold of a first embodiment.

FIGS. 3A to 3C are cross-sectional views explaining a production method of the master mold shown in FIG. 1.

FIGS. 5A to 5C are cross-sectional views explaining the method for producing a lens array utilizing the master mold.

FIGS. 6A and 6B are cross-sectional views explaining the method for producing a lens array and the like.

DESCRIPTION OF EMBODIMENTS

First Embodiment

Figure 2A:
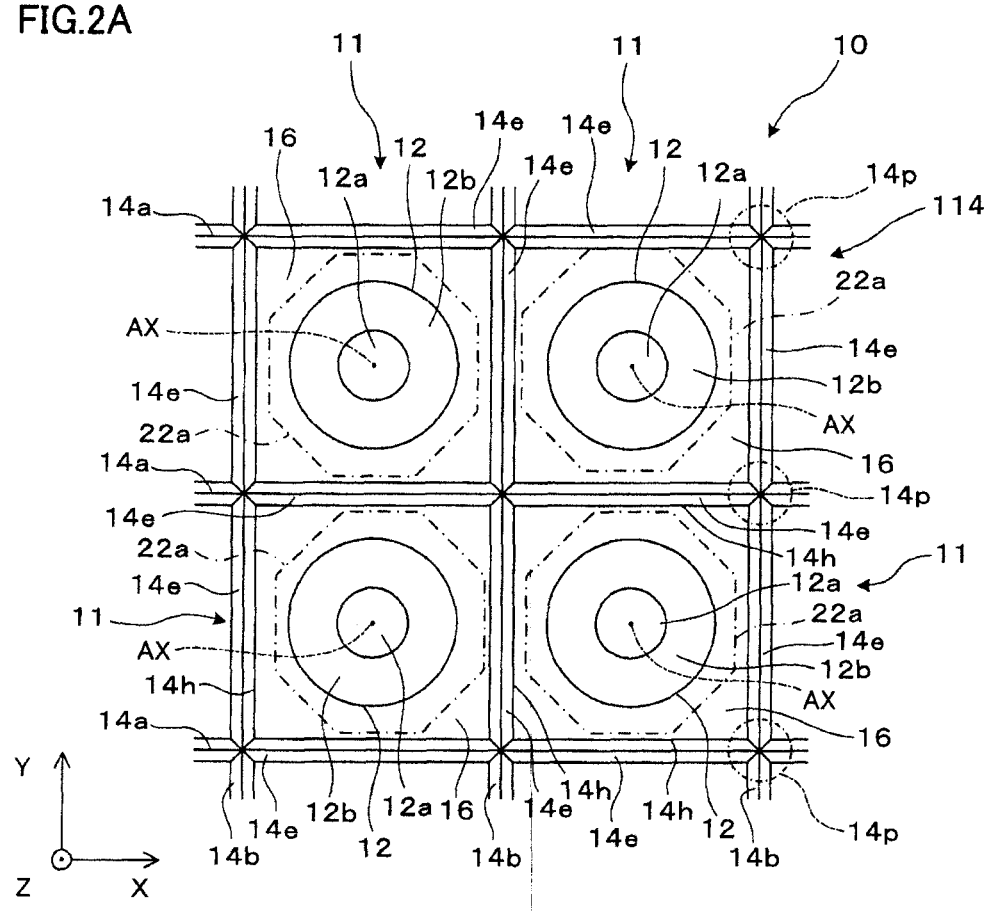
FIG. 2A is a partial enlarged plan view of the master mold.

With reference to the drawings, there will be explained a method for producing a lens array and the like according to a first embodiment of the present invention.

A) Master Mold of a Molding Mold

As shown in FIG. 1, a master mold 10 which is a molding mold for indirectly producing a lens array is a plate-like member having a square or circular contour, for example, and has a molding surface 10a on the side of an end surface which is one major surface. The molding surface 10a has many minute mold areas 11 which are partitioned into squares, and these mold areas 11 are arranged in a matrix extending in the horizontal and vertical X and Y directions as a whole. The mold areas 11 provided on the molding surface 10a have the same three-dimensional shape within the same square contour as one another. At the center in each of the mold areas 11, a circular cavity part 12 is provided and the each periphery of the mold areas 11 is surrounded by a rectangular frame-shaped groove 14 which includes four side parts (groove parts 14e to be described below). The four sides in each of the many grooves 14 surrounding the two-dimensionally arranged mold areas 11 are formed continuously, and form a grid-like groove 114 as a whole. That is, each of the mold areas 11 is partitioned by the grid-like groove 114 and separated from the periphery thereof, and any pair of neighboring mold areas 11 has the linear groove part 14e extending therebetween as a common boundary.

Figure 2B:
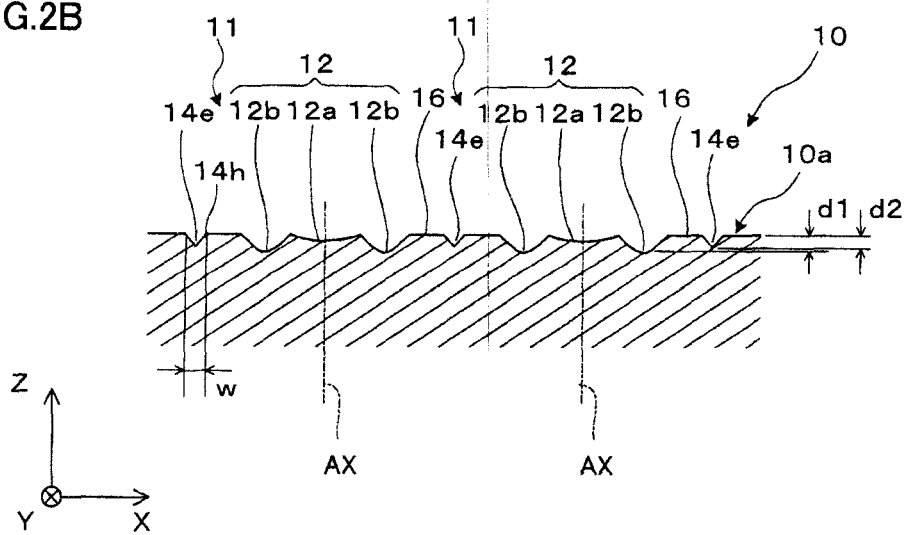
FIG. 2B is a partial enlarged cross sectional view of the master mold.

As shown in FIGS. 2A and 2B, each of the mold areas 11 includes the center cavity part 12 and a peripheral flat surface 16. The center cavity part 12 includes a first transfer surface part 12a for forming an optical surface of an individual finally-obtained lens element (effective area) and a second transfer surface part 12b for forming an edge part of the optical surface of the individual lens element (outer part of the effective area). The first transfer surface parts 12a are arranged on grid points having the same spacing corresponding to the arrangement of the mold areas 11, and have a shape corresponding to the optical surface of the finally-obtained lens element, which, although formed here having an approximately a hemispherical concave surface, may be formed having a convex surface or a convex-concave surface. The second transfer surface part 12b is a ring-shaped part surrounding the first transfer surface part 12a. The second transfer surface part 12b has a shape formed along a rotational plane having the center at an axis AX of the first transfer surface part 12a, and is formed in a shape corresponding to a convex-concave shape in an edge part of the optical surface of the finally-obtained lens element and, here, formed having a concave surface of a toroidal shape (shape in which a circular ark is moved along a circle). The peripheral flat surface 16 is a flat plane extending perpendicular to the axis AX, and corresponds to a fame part of the finally-obtained lens element.

As shown in FIG. 1, FIG. 2A, and the like, the grid-like groove 114 spreading across the molding surface 10a includes a group of groove elements 14a extending in parallel to the first X direction at the same spacing and a group of groove elements 14b extending in parallel to the second Y direction perpendicular to the X direction at the same spacing, and the group of groove elements 14a and the group of groove elements 14b configure a first groove set 14c and a second groove set 14d, respectively. Each of the groups of the groove elements 14a and 14b configuring these groove sets 14c and 14d, that is, the individual groove parts 14e has a V-shape cross section where the groove width w shown in FIG. 2B is not smaller than 200 μm. An outer edge in each of the groove elements 14a and 14b (that is, boundary with the flat surface 16) is formed having an obtuse edge 14h which comes from the V-shape cross section, and configured so as to cause resin to hardly run over into the groove elements 14a and 14b or the groove part 14e by the anchor effect of the edge 14h (to brake a resin flow utilizing an apparently large edge contact angle). The groove elements 14a and 14b may have any cross-sectional shape of a rectangle, a semicircle, and an ellipsoid, not limited to the V-shape cross section, and, also in this case, it is possible to cause the edge 14h to exert the anchor effect. Each of the groove elements 14a and 14b, while being collectivity combining the groove parts 14e as a unit, extends linearly and can be formed by a speedy and simple work using a cutting tool. As illustrated partially in FIG. 2B, each depth d2 of the groove elements 14a and 14b or the groove parts 14e is set to be smaller than the depth d1 of the cavity part 12, and is configured not to cause the following transfer process to be prevented by a convex part which is an inversion of the groove part 14e formed of the resin, even if the groove elements 14a and 14b or the groove parts 14e are filled with the resin.

The master mold 10 is formed of metal material. The metal material includes an iron-nickel based alloy or the other steels, for example. Specifically, SUS304, SUS420J2, STAVAX (UDDEHOLM Company), stainless invar, Permalloy or the like can be used. The master mold 10 can be formed by means of covering a substrate made of a metal material as described above with another metal or the like, and optical surface finishing work becomes easy when electroless nickel plating or copper plating is provided. Here, the master mold 10 or a base material thereof may be formed of material such as glass and metal glass, not limited to the metal material. Note that, from a viewpoint of providing a highly precise molding surface 10a, generally the master mold 10 is preferably formed of the metal material.

B) Production Process of a Master Mold

As shown in FIG. 3A, the groove sets 14c and 14d are formed sequentially on a surface 10g of a material 10f of the master mold 10 shown in FIG. 1 by cutting of the groove elements 14a and 14b utilizing a cutting tool or a grinding tool. Generally, the cutting tool is suitable when the master mold 10 is formed of the metal material, and the grinding tool is suitable for finishing the upper edge 14h of the groove sharply when the master mold 10 is formed of a material difficult to cut such as glass and the like. By the above process, the grid-like groove 114 can be formed on the material 10f. Here, each of the groove elements 14a and 14b extends in a straight line and it is possible to perform a highly precise work only by moving the cutting tool linearly. At this time, by performing the work from one end to the other end of the master mold 10 in a straight line at a time, it is possible to perform the work having a better preciseness. Further, it becomes advantageous for the work in preciseness and also in cost to cause the groove elements 14a and 14b to be worked so as to intersect each other perpendicularly, that is, orthogonally at connection parts and so as to form shapes approximately close to grid-like squares after the work. Note that the work preciseness of the groove elements 14a and 14b is allowed to be lower than the work preciseness of the cavity part 12. For the material 10f which is an object to be provided with the groove elements 14a and 14b, an end surface of the base material which is made of a metal material, for example, is cut to form a flat surface, and this flat surface is provided with electroless nickel plating to form the flat surface 10g. Note that, by working the groove elements 14a and 14b first, it is also possible to use the groove elements 14a and 14b as a mark for the work of the cavity part and the like.

Next, as shown in FIG. 3B, tentative-work concave parts 71 shallower than the cavity parts 12 are formed by the cutting tool on the surface 10g of the material 10f for the master mold 10. The tentative-work concave parts 71 are arranged two-dimensionally on the grid points the same as the cavity parts 12 of a completed master mold. The work preciseness of the temporary-work concave part 71 is allowed to be lower than the work preciseness of the cavity part 12.

Next, as shown in FIG. 3C, the cavity parts 12 are formed by the cutting tool on the surface 10g of the material 10f for the master mold 10. The work preciseness of the cavity part 12 is identical to the preciseness of the optical surface in the finally-obtained lens part. In the periphery of the cavity part 12, the surface 10g which has not been worked remains to become the flat surface 16. Note that the flat surface 16 can be also formed by means of slightly cutting a surface layer which includes the surface 10g.

C) Production Process of a Lens Array

First, a sub-master mold 20 (refer to FIG. 5A) is formed by the use of the master mold 10 fabricated in the process of FIGS. 3A to 3C.

Figure 4A:
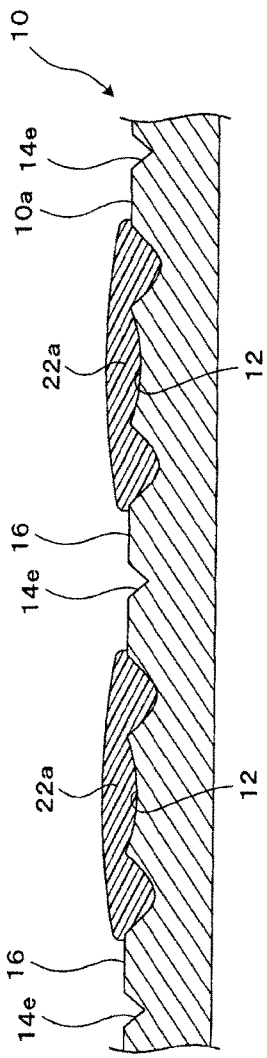
FIGS. 4A to 4C are cross-sectional views explaining a method for producing a lens array utilizing the master mold.

Specifically, as shown in FIG. 4A, a first resin material 22a is disposed as a photocurable resin on the molding surface 10a of the master mold 10. At this time, the first resin material 22a is disposed independently in each of the cavity parts 12. The first resin material 22a protrudes from the concave cavity part 12 because of the viscosity and surface tension thereof.

Figure 4B:
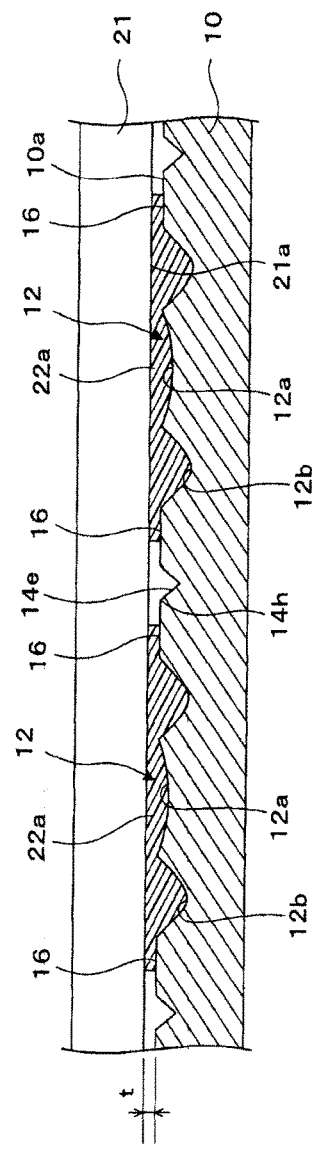

After that, as shown in FIG. 4B, a substrate 21 or the like is aligned and disposed so as to cause the molding surface 10a of the master mold 10 to be positioned under one surface 21a of the substrate 21 for the sub-master mold 20, the master mold 10 is pressed from under the substrate 21, and the molding surface 10a of the master mold 10 and the surface 21a of the substrate 21 are caused to come close to each other until an appropriate gap is obtained. Here, the first resin material 22a is pressed by the master mold 10 and the substrate 21, and is caused to spread to the position of the flat surface 16 outside the first and second transfer surface parts 12a and 12b.

Figure 7:
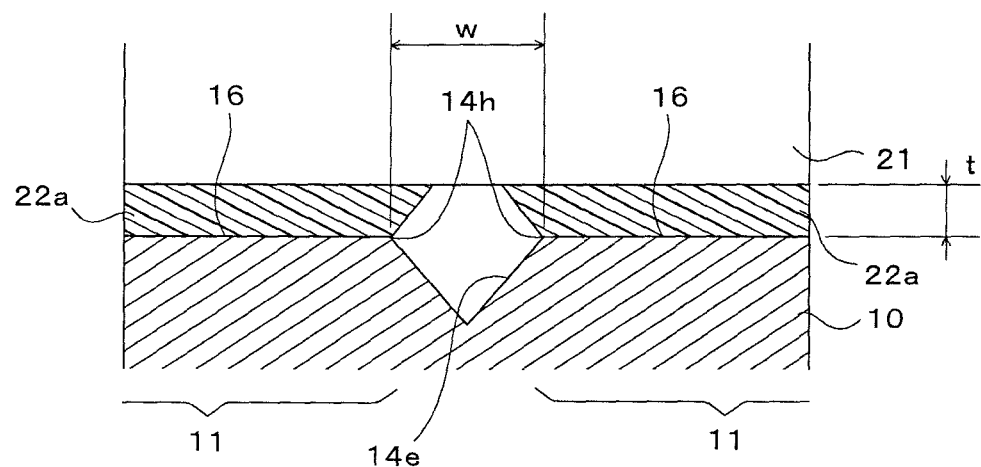
FIG. 7 is a partial enlarged diagram explaining a role of a groove part provided for the master mold.

At this time, as shown in FIG. 7, even when the first resin material 22a spreads farthest in the lateral direction, since the groove part 14e exists between the neighboring cavity parts 12, the first resin material 22a of the specific cavity part 12 can be prevented from flowing into the side of the neighboring cavity part 12. That is, it is possible to prevent the first resin material 22a from overflowing between the neighboring mold areas 11. In particular, since the edge 14h is formed at the outer edge of the groove part 14e, the first resin material 22a can be prevented from flowing into the groove part 14e. In this manner, the first resin material 22a can be prevented from flowing into the groove part 14e because a wet angle (contact angle) becomes apparently larger by the edge 14h formed at the outer edge of the groove part 14e to increase a spread prevention effect.

As shown by the chain line in FIG. 2A, while the first resin material 22a may run over from the cavity part 12 and spread along the flat surface 16 to reach the groove part 14e, the first resin material 22a does not fill the groove part 14e. Even if the first resin material 22a flows into the groove part 14e, the first resin material 22a hardly reaches a corner part 14p where the pair of groove parts 14e and 14e intersects each other, and each center side of the groove parts 14e and 14e is preferentially filled. Therefore, it is possible to prevent the portions of the first resin material 22a which have spread in directions opposite to each other from contacting each other to create the weld trapping air bubbles, in any of the groove parts 14e.

Figure 8A:
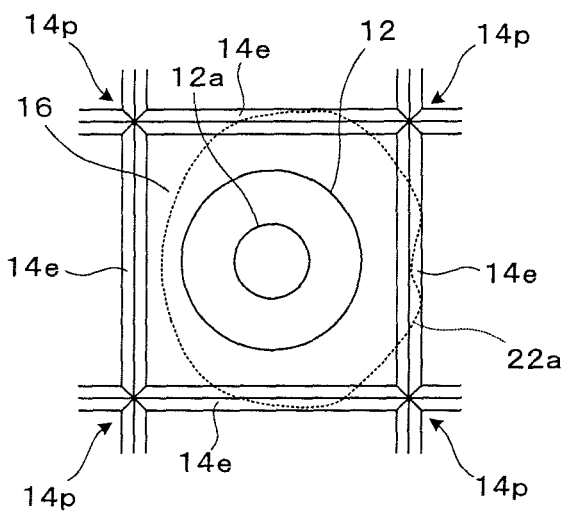
FIG. 8A is a diagram explaining a run-over state of resin in an embodiment having a linear groove at an outer edge of a flat surface in the surrounding of a cavity part.
Figure 8B:
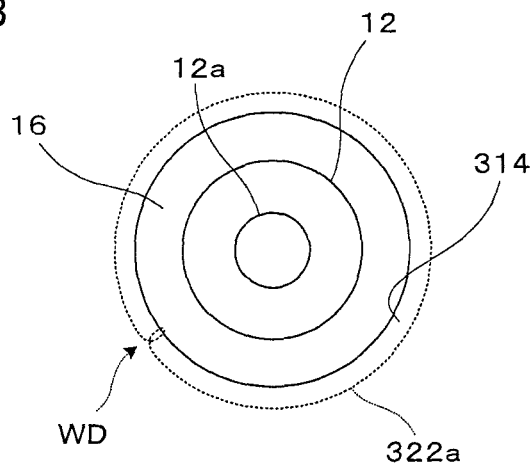
FIG. 8B is a diagram explaining a run-over state of resin in a comparative example having a ring-band shaped hollow at an outer edge of a flat surface in the surrounding of the cavity part.

FIG. 8A shows a case in which the first resin material 22a is supplied locally further excessively. In this case, while the first resin material 22a comes close to the corner part 14p where the groove parts 14e and 14e intersect each other, at two positions, the weld where the rein portions are connected to each other is not formed. On the other side, when a conventional ring-band shaped hollow 314 exists in the peripheral of a flat surface 16 as in a comparative example shown in FIG. 8B, a resin material 322a spreads along inner edge of the hollow 314 and forms the weld WD where portions of the resin are connected to each other.

Figure 9:
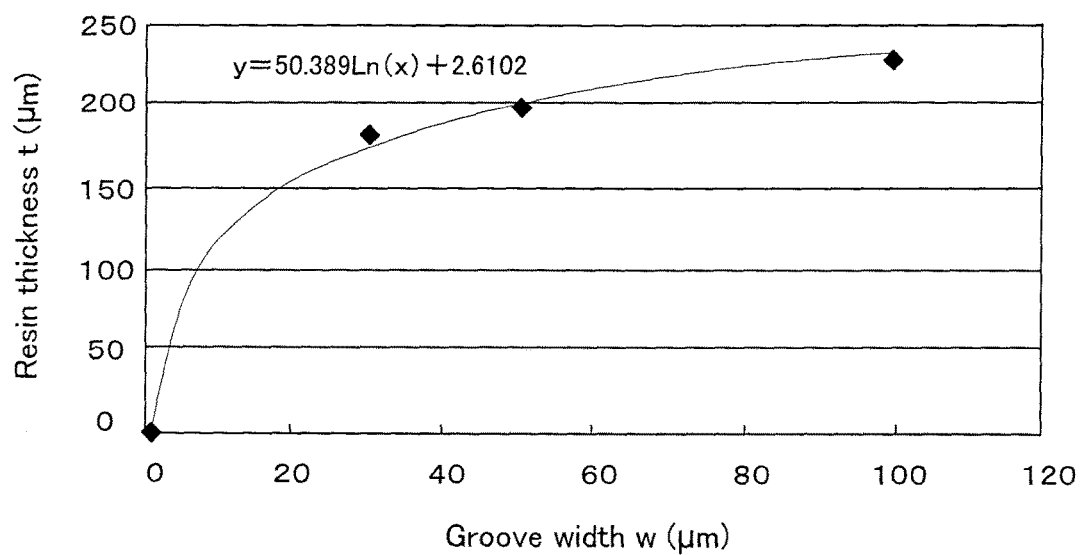
FIG. 9 is a chart showing a relationship between the thickness t of a first resin material and the groove width w of a groove part.

Here, there will be studied a relationship between the groove width w of the groove part 14e provided for the master mold 10 (refer to FIG. 7 and FIG. 2B) and the thickness t of the first resin material 22a spreading sandwiched between the substrate 21 and the flat surface 16 (refer to FIG. 7 and FIG. 4B). Generally, as the thickness t is smaller, spread in the molding is smaller and the required groove width w becomes also smaller. As a result of the study about the relationship between the groove width w of the groove part 14e and the thickness t of the first resin material 22a in a specific fabrication example, as shown by the signs "♦" in FIG. 9, the groove width w of the groove part 14e needs to be secured so as to be larger than the corresponding value for the plurality of thicknesses t of the first resin material 22a. When the points of these signs "♦" are approximated by a curve, the curve is logarithmic and, when the thickness t is assumed to be 1 μm and the groove width w is assumed to be larger than 0 μm, the following relational expression is obtained.

$$w > 50.389 \cdot \ln(t) + 2.6102 \quad (1)$$

Accordingly, in approximation, the groove width w of the groove part 14e is preferably set according to the thickness t of the first resin material 22a so as to satisfy the following relational expression.

$$w > 50 \cdot \ln(t) + 2 \quad (2)$$

Figure 4C:
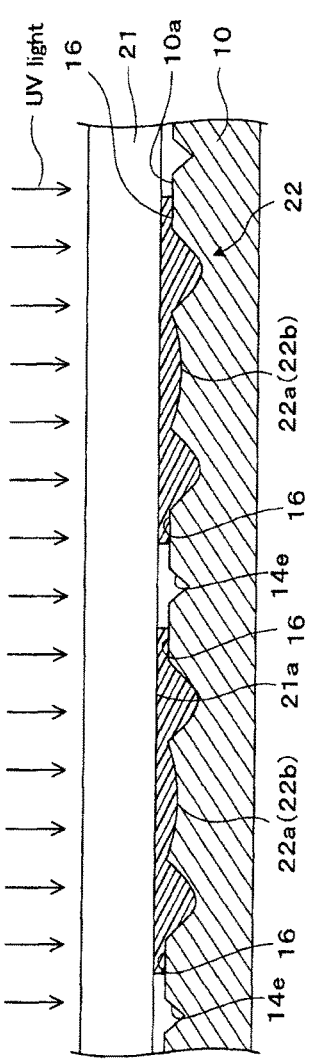

Next, as shown in FIG. 4C, the substrate 21 is irradiated with curing light having a predetermined wavelength such as UV light by a light source which is not shown in the drawing, and the first resin material 22a which is sandwiched between the master mold 10 and the substrate 21 is cured. Resultantly, the molding surface 10a of the master mold 10 is transferred and a first resin layer 22 configured with the cured resin is formed.

Next, heating treatment is performed in a state where the substrate 21 and the master mold 10 are bonded to each other. Specifically, as finishing curing processing, the master mold 10 is heated together with the substrate 21 at approximately 40° C. to 70° C. in a predetermined time. Thereby, the first resin layer 22 is heated and the first resin layer 22 is cured completely.

Next, as shown in FIG. 5A, the first resin layer 22 and the substrate 21 are demolded from the master mold 10 as a unit. Thereby, it is possible to obtain the sub-master mold 20 in which the resin layer 22 is formed on one side of the substrate 21 configured with many resin layer parts 22b. In this sub-master 20, the surface of the resin layer 22 is a molding surface 20a (transfer surface) for the next mold.

In the above, while the sub-master mold 20 can be formed by one transfer of the master mold 10, the plurality of resin layer parts 22b can be formed step by step on a partial area of the substrate 21 by plural transfers of the master mold 10 and the resin layer 22 can be formed gradually.

In the following series of processes, a lens array 40 (refer to FIG. 5C) is formed by the use of the sub-master mold 20 shown in FIG. 5A and the like.

Specifically, as shown in FIG. 5B, an element resin material 42a is disposed on the first resin layer 22 of the sub-master mold 20 as a photocurable resin. At this time, the element resin material 42a is disposed independently on each of the resin layer parts 22b configuring the first resin layer 22, and also a substrate 41 or the like which is a thin flat plate having an optical transparency is aligned and disposed so as to cause the sub-master mold 20 to be positioned under one surface 41a of the substrate 41, and the sub-master mold 20 is pressed from under the substrate 41. At this time, while the element resin material 42a is pressed and spread in the lateral direction, a neck part 42n and an extending part 42o are formed by a convex part 22p provided for the resin layer part 22b of the first resin layer 22, and excessive resin is configured to hardly run over outside the resin layer part 22b.

Next, the substrate 41 is irradiated with curing light having a predetermined wavelength such as UV light by a light source which is not shown in the drawing, the element resin material 42a which is sandwiched between the sub-master mold 20 and the substrate 41 is cured. Resultantly, the molding surface 20a provided on the lens part which is resin layer part 22b of the sub-master mold 20 is transferred and a first lens resin layer 42 configured with the cured resin is formed. After that, heating treatment is performed in a state where the substrate 41 and the sub-master mold 20 are bonded to each other. Thereby, the first lens resin layer 42 is heated and cured completely.

Next, as shown in FIG. 5C, the first lens resin layer 42 and the substrate 41 are demolded from the sub-master mold 20 as a unit. Thereby, the lens array 40 can be obtained in which the first lens resin layer 42 configured with a lens part 42b of many resin layer parts is formed on one side of the substrate 41.

After that, a lens array 140 (refer to FIG. 6A) is formed by the use of a sub-master mold (not shown in the drawing) having the same structure as the sub-master mold 20 shown in FIG. 5A and the like.

That is, as shown in FIG. 6A and the like, a second lens resin layer 43 is formed provided with many lens parts 43b on a surface 41b opposite to the lens array 40 shown in FIG. 5C. While detailed explanation will be omitted, the second lens resin layer 43 is also fabricated the same as the first lens resin layer 42 by transferring of a sub-master mold obtained from the same master mold as the master mold 10 shown in FIG. 3C. The lens array 140 obtained in this manner is a half-finished product called a wafer-level lens and includes many lens elements in a state arranged two-dimensionally.

As shown in FIG. 6B, lens elements 50 included in the lens array 140 are divided into pieces by means of cutting the lens array 140 of FIG. 6A along cutting lines CL. The lens element 50 is a compound lens having a square shape in a plan view. The lens element 50 is provided with a first lens part L1 which is any one of the lens part 42b in the first lens resin layer 42, one second lens part L2 facing the above first lens part L1 among the lens parts 43b in the second resin layer 43, and a part PP which is a part of the substrate 41 sandwiched between these lens parts L1 and L2. In the lens element 50, a molding surface 42t of the first lens part L1 and a molding surface 43t of the second lens part L2 are optical surfaces.

While, in the above explanation, the first lens rein layer 42 is formed by the sub-master mold 20, a sub-sub-master mold 30 (refer to FIG. 10C) can be formed by the sub-master mold 20 and the first lens resin layer 42 can be formed by the sub-sub-master mold 30.

Figure 10A:
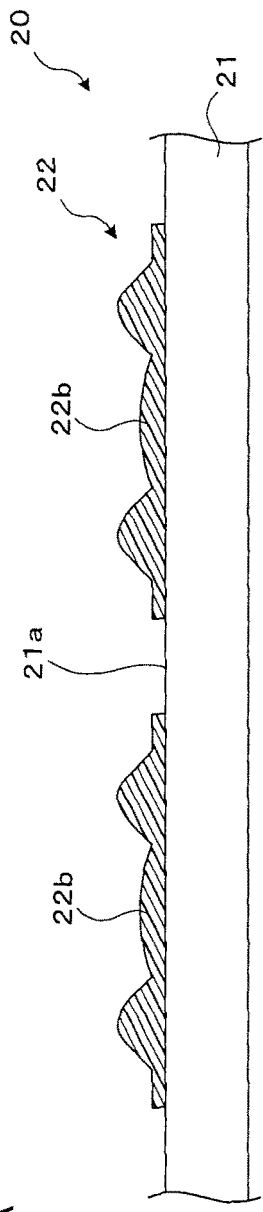
FIGS. 10A to 10C are cross-sectional views explaining a variation example of a method for producing a lens array.
Figure 10B:
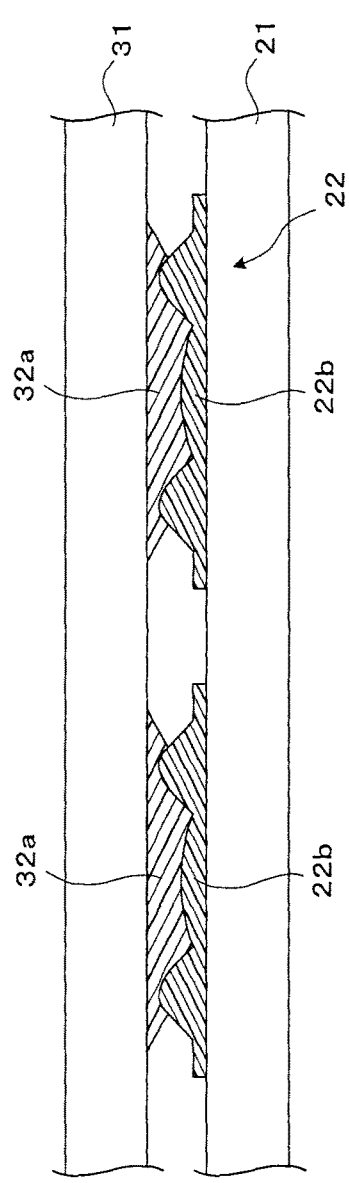
Figure 10C:
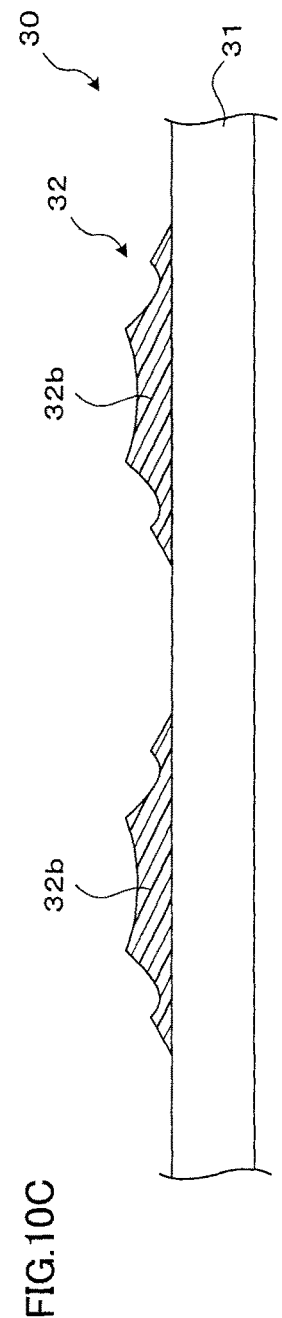

Specifically, the sub-sub-master mold 30 in which a resin layer 32 is formed configured with a resin layer part 32b on a substrate 31 is obtained as shown in FIG. 10C from the sub-master mold 20 of FIG. 10A, via a displacement or supply process of a second resin material 32a, a substrate 31 press process, a curing light irradiation process, and a finishing heating treatment shown in FIG. 10B.

Figures 11A, 11B:
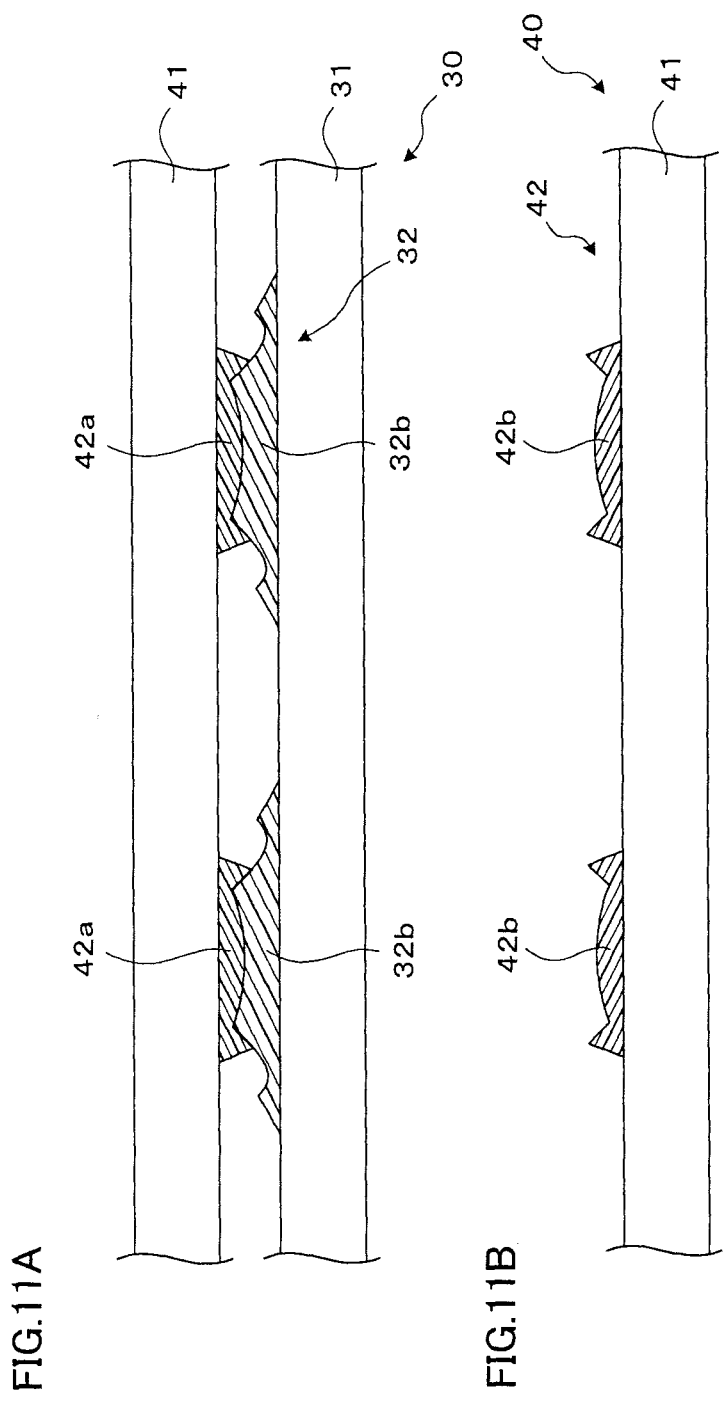
FIGS. 11A and 11B are cross-sectional views explaining a variation example of a method for producing a lens array.

After that, the lens array 40 in which the first lens resin layer 42 configured with the lens parts 42b is formed is obtained from the sub-sub-master mold 30 of FIG. 10C via the disposing or supply process of the element resin material 42a, the substrate 41 press process, the curing light irradiation process, and the finishing heating treatment shown in FIG. 11A. In this case, the lens array 40 is formed by three transfers. Note that, while explanation has been omitted, the second resin layer can be provided on the opposite side from the first lens resin layer 42.

Meanwhile, the first lens resin layer 42 can be also formed directly by the master mold 10. In this case, the lens array 40 is formed by one transfer, and has the same shape as the sub-master mold 20.

While FIG. 7 explains a case in which the cross-sectional shape of the groove part 14e provided in the master mold 10 (i.e., shape of a cross section perpendicular to the direction of groove extension) is a V-shape, the cross-sectional shape of the groove part 14e may be any shape of a trapezoid, a rectangle, a polygon, a semicircle, and an ellipsoid as shown in FIGS. 12A to 12E, not limited to a V-shape.

Figure 12A:
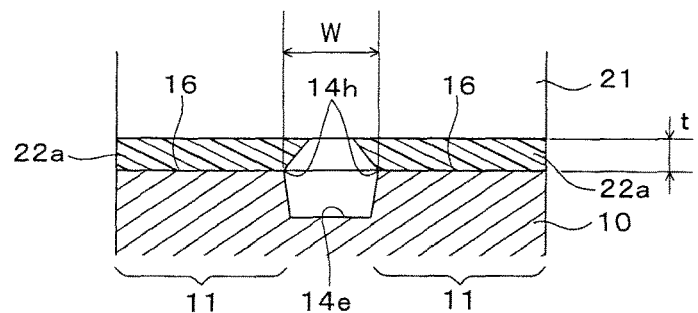
FIGS. 12A to 12E are diagrams explaining a variation example of a cross-sectional shape of a groove part.
Figure 12B:
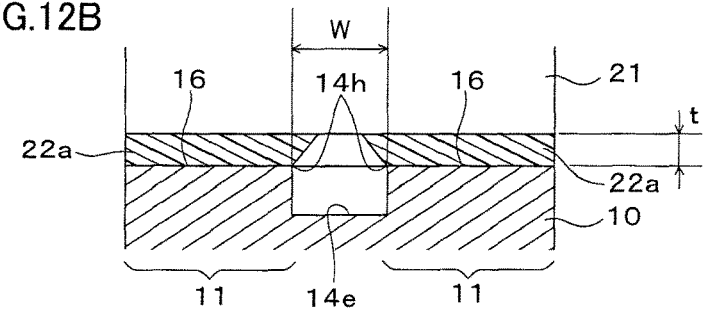
Figure 12C:
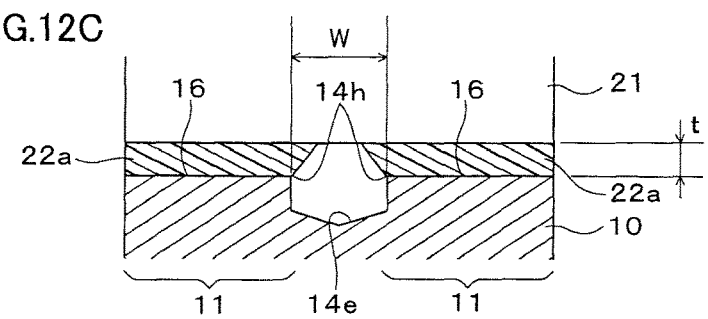
Figure 12D:
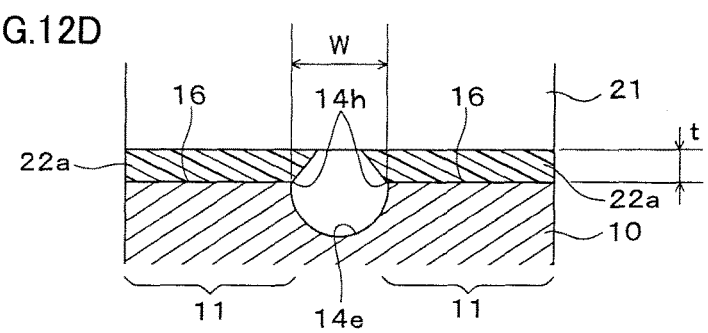
Figure 12E:
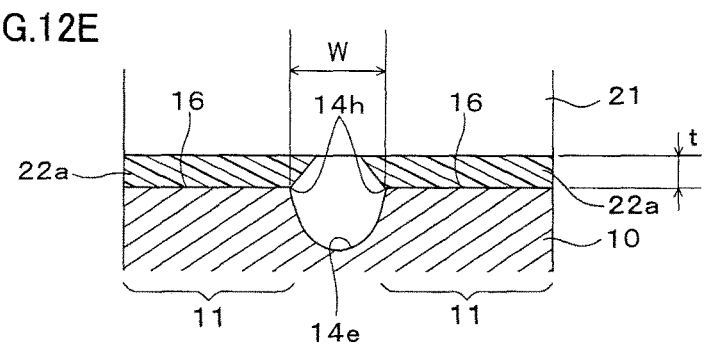

In particular, the trapezoidal shape shown in FIG. 12A is easy to work and the groove width is easy to adjust. In the groove of the V-shape, since a comparatively large groove edge exists after the groove work, and, when additional work is provided for the flat surface 16, the groove becomes shallower and the groove width is reduced, and therefore it is not easy to obtain a desired groove width. On the other side, in the case of the trapezoidal shape, it is possible to obtain a smaller groove edge, and it is easy to adjust the groove width regardless whether the additional work is performed or not and the work thereof is also easily performed because of a comparatively simple shape thereof.

According to the production method of the first embodiment explained above, since the master mold 10 of a molding mold includes the plurality of linear groove parts 14e surrounding the plurality of cavity parts 12, the resin hardly spreads to the corner part 14p where the adjacent linear groove parts 14e and 14e intersect each other and it is possible to prevent portions of the resin which have run over toward the adjacent groove parts 14e and 14e from spreading so as to come close to each other and being brought into contact with each other to create a weld trapping air bubbles. Further, the linear groove part 14e is not separated but connected to each other to form the grid-like groove 114, and the grid-like groove 114 can be formed by collective working and it is possible to work the molding mold in a short time even if the lens element 50 becomes smaller.

Second Embodiment

In the following, a method for producing a lens array according to a second embodiment will be explained. Note that the present embodiment is a partial modification of the lens array production method of the first embodiment, and a part or item without particular explanation is the same as that in the case of the first embodiment.

Figure 13:
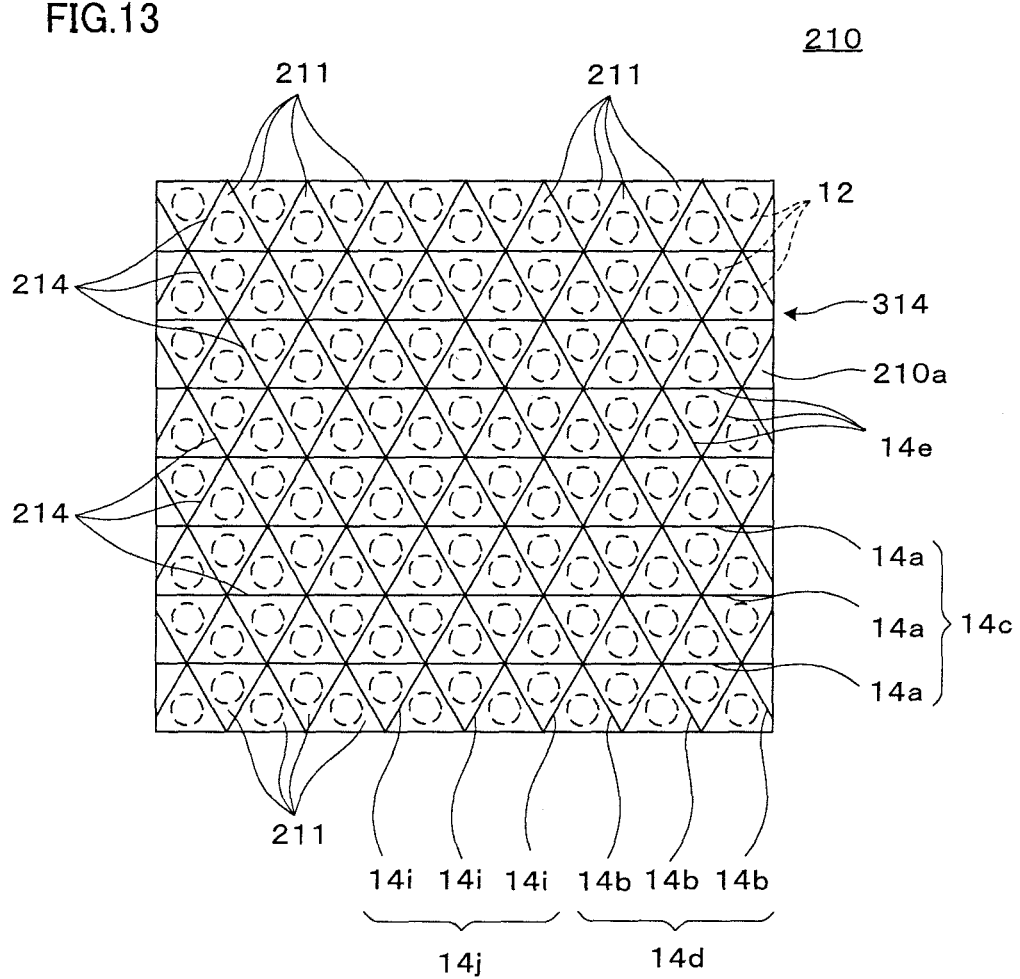
FIG. 13 is a diagram explaining a method for producing a lens array according to a second embodiment.
Figure 14A:
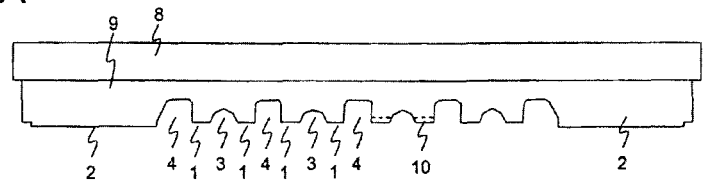
FIGS. 14A and 14B are diagrams cited from a prior art literature.
Figure 14B:
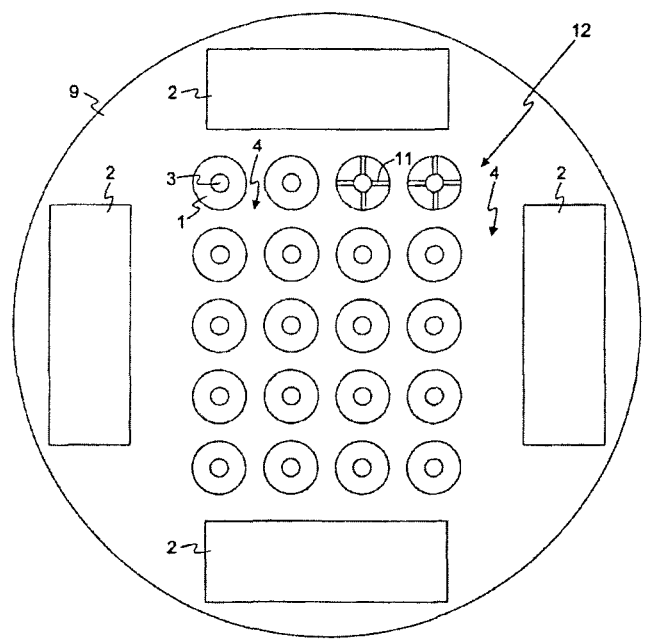
Figure 15:
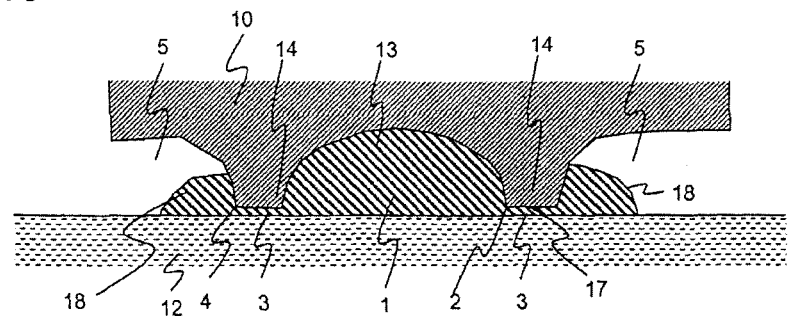
FIG. 15 is a diagram cited from a prior art literature.

As shown in FIG. 13, a master mold 210 which is a molding mold for indirectly producing a lens array has a molding surface 210a on the side of an end surface which is one major surface. The molding surface 210a has many minute mold areas 211 partitioned in a triangular squama pattern. Each of the mold areas 211 provided in the molding surface 210a has the same three-dimensional shape within the same regular-triangle-shaped contour, although the upper and lower directions are inverted alternately. At each center of the mold areas 211, a circular cavity part 12 is provided, and each peripheral of the mold areas 211 is surrounded by a groove 214 which is configured with three groove parts 14e and has a triangular frame shape. The many grooves 214 surrounding the mold areas 211 arranged two-dimensionally forms a grid-like groove 314 as a whole. That is, each of the mold areas 211 is partitioned by the grid-like groove 314 and separated from the periphery, and any pair of neighboring mold areas 211 has a common boundary of the linear groove part 14e which extends therebetween.

The grid-like groove 314 spreading across the molding surface 210a is provided with a first groove set 14c configured with a group of groove elements 14a which are arranged extending in parallel to a first direction at the same spacing, a second groove set 14d configured with a group of groove elements 14b which are arranged extending in parallel to a second direction slanted in 60 degrees to the first direction at the same spacing, and a third groove set 14j configured with a group of groove elements 14i which are arranged extending in parallel to a third direction slanted in 60 degrees to the first and second directions at the same spacing. Each of the groove elements 14a, 14b, and 14i configuring these groove sets 14c, 14d, and 14j has any cross-sectional shape of a trapezoidal shape, a V-shape, a rectangular shape, a polygonal shape, semicircular shape, and an ellipsoidal shape, for example (refer to FIG. 7, FIGS. 12A to 12E). Here, each of the groove elements 14a, 14b, and 14i extends in a straight line on the molding surface 210a, and can be worked in a high precision only by means of moving a cutting tool linearly.

Note that the present invention is not limited to the above embodiments and can be modified appropriately in a range without departing from the gist thereof.

While, in the above embodiments, the substrates 21, 31, and 41 are formed of glass, the substrates 21, 31, and 41 can be formed of resin material having optical transparency.

The shapes of the transfer surface parts 12a, 12b, and the like shown in the above embodiments are only illustration, and various shapes can be used according to an application of the lens element 50.

While, in the above embodiments, the light irradiation processing and the heating treatment for curing are performed for the substrates 21, 31, 41, and the like, the heating treatment can be omitted for a case in which the resin material can be cured sufficiently only by the light irradiation processing, for example.

The invention claimed is:

1. A method for producing a lens array that includes a substrate and a resin layer which is formed on at least one substrate surface of the substrate and has a plurality of lens parts, comprising:
forming the plurality of lens parts by one or more transfers utilizing a master molding mold which has a transfer surface corresponding to a surface shape of the plurality of lens parts,
wherein the molding mold has a plurality of cavity parts corresponding to the plurality of lens parts and a plurality of linear groove parts surrounding individual cavity parts which configure the plurality of cavity parts, respectively, each of the plurality of cavity parts including a first transfer surface configured to form an optical surface of a lens element, and a concave second transfer part configured to form an edge part of the optical surface of the lens element,
wherein each of the plurality of linear groove parts has an edge on a surface side of the molding mold and a cross sectional shape of the plurality of linear groove parts is selected from the group consisting of a trapezoid, a V-shape, a semicircular shape and an oval shape, and
wherein each of the plurality of linear groove parts has a groove depth smaller than each depth of the plurality of cavity parts.

2. The method for producing a lens array according to claim 1, wherein
the molding mold is partitioned into a plurality of mold areas by the plurality of linear groove parts.

3. The method for producing a lens array according to claim 2, wherein
the molding mold is partitioned into a plurality of polygonal mold areas by a combination of the plurality of linear groove parts.

4. The method for producing a lens array according to claim 3, wherein
the molding mold is partitioned into a plurality of rectangular mold areas by a grid-like arrangement of the plurality of linear groove parts.

5. The method for producing a lens array according to claim 1, wherein
each of the plurality of linear groove parts has a V-shape.

6. The method for producing a lens array according to claim 1, wherein
each of the plurality of linear groove parts has a groove width not smaller than 200 μm.

7. The method for producing a lens array according to claim 1, wherein
the following condition is satisfied, when a groove width of each of the groove parts and a thickness of a resin material in a surrounding of the each of the groove parts are set to w [μm] and t [μm], respectively:

$$w > 50 \times \ln(t) + 2.$$

8. The method for producing a lens array according to claim 1, wherein
a resin material of which the resin layer is formed is disposed independently in each of the plurality of cavity parts so as to protrude from the each of the plurality of cavity parts.

9. A method for producing a lens array that includes a substrate and a resin layer which is formed on at least one substrate surface of the substrate and has a plurality of lens parts, comprising:
preparing a master resin molding mold having a transfer surface corresponding to a surface shape of the plurality of lens parts, wherein the transfer surface comprises a plurality of cavity parts corresponding to the plurality of lens parts and a plurality of linear groove parts surrounding individual cavity parts which configure the plurality of cavity parts, respectively, each of the plurality of cavity parts including a first transfer surface configured to form an optical surface of a lens element, and a concave second transfer part configured to form an edge part of the optical surface of the lens element,
wherein each of the plurality of linear groove parts has an edge on a surface side of the resin molding mold and a cross sectional shape of the plurality of linear groove parts is selected from the group consisting of a trapezoid, a V-shape, a semicircular shape and an oval shape, and
wherein each of the plurality of linear groove parts has a groove depth smaller than each depth of the plurality of cavity parts; and
forming the plurality of lens parts by one or more transfers utilizing the resin molding mold.

10. The method for producing a lens array according to claim 9, wherein
the resin molding mold is partitioned into a plurality of mold areas by the plurality of linear groove parts.

11. The method for producing a lens array according to claim 9, wherein
the resin molding mold is partitioned into a plurality of polygonal mold areas by a combination of the plurality of linear groove parts.

12. The method for producing a lens array according to claim 9, wherein
the resin molding mold is partitioned into a plurality of rectangular mold areas by a grid-like arrangement of the plurality of linear groove parts.

13. The method for producing a lens array according to claim 9, wherein
each of the plurality of linear groove parts has a V-shape.

14. The method for producing a lens array according to claim 9, wherein
each of the plurality of linear groove parts has a groove width not smaller than 200 μm.

15. The method for producing a lens array according to claim 9, wherein
the resin molding mold is partitioned into a plurality of mold areas by the plurality of linear groove parts, the resin molding mold is partitioned into a plurality of polygonal mold areas by a combination of the plurality of linear groove parts, and the resin molding mold is partitioned into a plurality of rectangular mold areas by a grid-like arrangement of the plurality of linear groove parts.

* * * * *